United States Patent
Hikichi

(10) Patent No.: US 9,143,646 B2
(45) Date of Patent: Sep. 22, 2015

(54) IMAGE FORMING APPARATUS, METHOD FOR CONTROLLING IMAGE FORMING APPARATUS, AND STORAGE MEDIUM

(71) Applicant: CANON KABUSHIKI KAISHA, Tokyo (JP)

(72) Inventor: Atsushi Hikichi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/023,237

(22) Filed: Sep. 10, 2013

(65) Prior Publication Data

US 2014/0071479 A1    Mar. 13, 2014

(51) Int. Cl.
   *G06F 15/00* (2006.01)
   *H04N 1/00* (2006.01)

(52) U.S. Cl.
   CPC ....... *H04N 1/00891* (2013.01); *H04N 1/00896* (2013.01); *H04N 1/00925* (2013.01); *H04N 1/00928* (2013.01); *H04N 2201/0094* (2013.01)

(58) Field of Classification Search
   USPC ...................................................... 358/1.14
   See application file for complete search history.

(56) References Cited

U.S. PATENT DOCUMENTS

| 6,364,442 | B1 * | 4/2002 | Kawase et al. | 347/5 |
| 8,089,645 | B2 * | 1/2012 | Soda | 358/1.14 |
| 2002/0178389 | A1 * | 11/2002 | Satoh | 713/310 |

FOREIGN PATENT DOCUMENTS

JP    2009-064206 A    3/2009

* cited by examiner

*Primary Examiner* — Saeid Ebrahimi Dehkord
(74) *Attorney, Agent, or Firm* — Canon U.S.A., Inc. IP Division

(57) ABSTRACT

An image forming apparatus includes a setting unit configured to set a prohibition timer that prohibits shutdown when the image forming apparatus returns from a power saving state, and a control unit configured, when a shutdown time set in advance has passed, to control the shutdown of the image forming apparatus to be delayed until a time of the prohibition timer set by the setting unit is up, and to control the shutdown of the image forming apparatus to be forcibly performed when the time of the prohibition timer has been up.

8 Claims, 11 Drawing Sheets

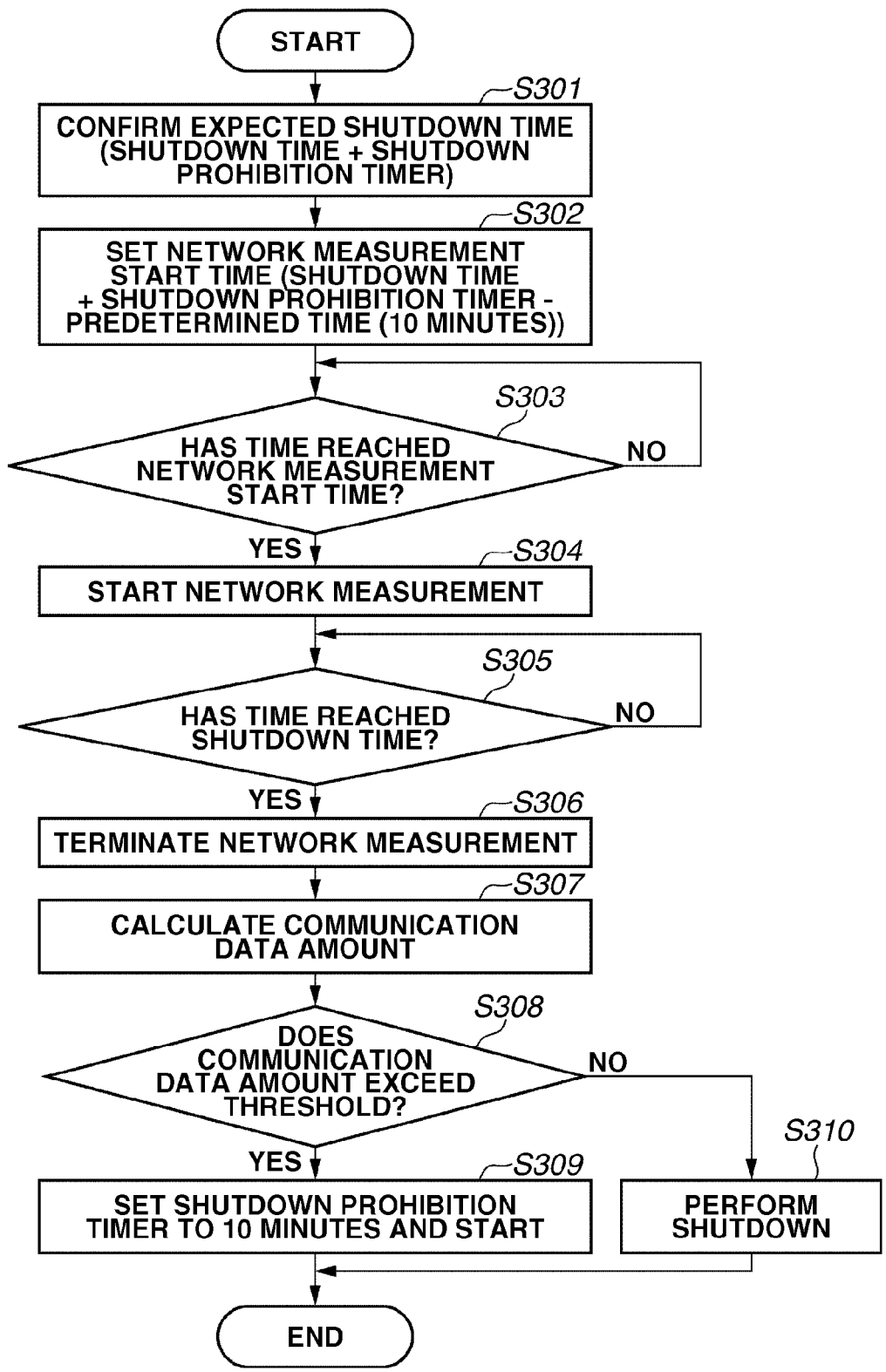

FIG.11

| PROTOCOL | PORT NUMBER | TRANSMISSION/ RECEPTION DATA AMOUNT | TTL | BAND USAGE RATE | AUTO SHUTDOWN PROHIBITION TIMER |
|---|---|---|---|---|---|
| H101 | H102 | H103 | H104 | H105 | H106 |
| TCP/IP UDP/IP | ALL | 60 MB/MINUTE | LESS THAN 10 STEPS | 50% OR MORE | 10 MINUTES |
| TCP/IP UDP/IP | ALL | 90 MB/MINUTE | LESS THAN 10 STEPS | 50% OR MORE | 5 MINUTES |
| TCP/IP UDP/IP | ALL | 40 MB/MINUTE | LESS THAN 10 STEPS | 50% OR MORE | NO SETTING |
| TCP/IP UDP/IP | ALL | 60 MB/MINUTE | 10 STEPS OR MORE | 50% OR MORE | 11 MINUTES |
| TCP/IP UDP/IP | ALL | 60 MB/MINUTE | LESS THAN 10 STEPS | LESS THAN 50% | 11 MINUTES |
| SNMP | — | 60 MB/MINUTE | LESS THAN 10 STEPS | 50% OR MORE | NO SETTING |

IMAGE FORMING APPARATUS, METHOD FOR CONTROLLING IMAGE FORMING APPARATUS, AND STORAGE MEDIUM

BACKGROUND OF THE INVENTION

1. Field of the Invention

The present invention relates to an image forming apparatus, an information processing method, and a storage medium.

2. Description of the Related Art

In recent years, a multifunction peripheral having a function to automatically shut down when not used by a user has been available with the progress of power saving. There are various methods of automatic shutdown. For example, an auto shutdown timer function (hereinafter, referred to as auto shutdown timer) is a function to start a timer upon entering a sleep state, and to automatically shut down a system when the timer is up after being left for several hours. In addition, an auto shutdown time function (hereinafter, referred to as weekly shutdown) is a function to designate a time of each day of the week by the user and to automatically shut down the system at the designated time.

Meanwhile, a server that manages the multifunction peripheral has been required to gather information for system optimization, that is, to create a base for reduction of the entire cost, which is the issue to be addressed by customers. Therefore, the server automatically gathers information on states of the multifunction peripherals at a designated time, and outputs data indicating, for example, usage conditions of the customers. In addition, a sales person proposes optimum arrangement, number, speed and the like of multifunction peripherals based on the data from the server.

These functions do not raise any problem in terms of the multifunction peripheral or the server alone. However, when considering the functions as a system, there is a problem. For example, if the multifunction peripheral automatically shuts down while the server is gathering information of the multifunction peripheral through a network, acquisition of the information ends halfway, that is, the acquisition fails.

Shutdown during data communication or disconnection upon entering sleep is not a mere bug but a normal operation. This is because the data communication occurs at various timings such as an inquiry of a state of a device by the server at a predetermined time interval using a simple network management protocol (SNMP). Therefore, if the connection cannot be cut during the data communication, there is little chance to shut down or to enter sleep. As a result, power consumption increases.

Japanese Patent Application Laid-Open No. 2009-64206 discusses a technology for extending a time to shut down if a device has already logged in to the network when shutdown is performed by pressing a power source button.

As described above, if the multifunction peripheral is shut down in the middle of the data acquisition by the server, the data acquisition by the server fails in the middle of the acquisition. In addition, if the failure of the server continues for several days, data missing happens, and data may not be updated.

Further, the server cannot learn what kind of setting has been made to the multifunction peripheral. If the server is self-developed, it can notify the multifunction peripheral of the data acquisition, and the multifunction peripheral can notify the server of a time to shut down, so that the problem can be avoided. However, in a case where the server is not self-developed, it is necessary to disclose a protocol and to ask the server to take measures, and thus, it is not so easy. In addition, even in the case of the self-developed server, it is necessary to take measures every time a new server is added. Therefore, the multifunction peripheral needs some measures.

SUMMARY OF THE INVENTION

The present invention is directed to a system enabling a server to reliably acquire data from an image forming apparatus.

An image forming apparatus includes a setting unit configured to set a prohibition timer that prohibits shutdown when the image forming apparatus returns from a power saving state, and a control unit configured, when a shutdown time set in advance has passed, to control the shutdown of the image forming apparatus to be delayed until a time of the prohibition timer set by the setting unit is up, and to control the shutdown of the image forming apparatus to be forcibly performed when the time of the prohibition timer has been up.

Further features of the present invention will become apparent from the following description of exemplary embodiments with reference to the attached drawings.

BRIEF DESCRIPTION OF THE DRAWINGS

FIG. 10 is a flowchart illustrating an example of shutdown prohibition timer extension processing.

FIG. 11 is a diagram for describing shutdown prohibition timer setting.

DESCRIPTION OF THE EMBODIMENTS

Various exemplary embodiments, features, and aspects of the invention will be described in detail below with reference to the drawings.

Figure 1:
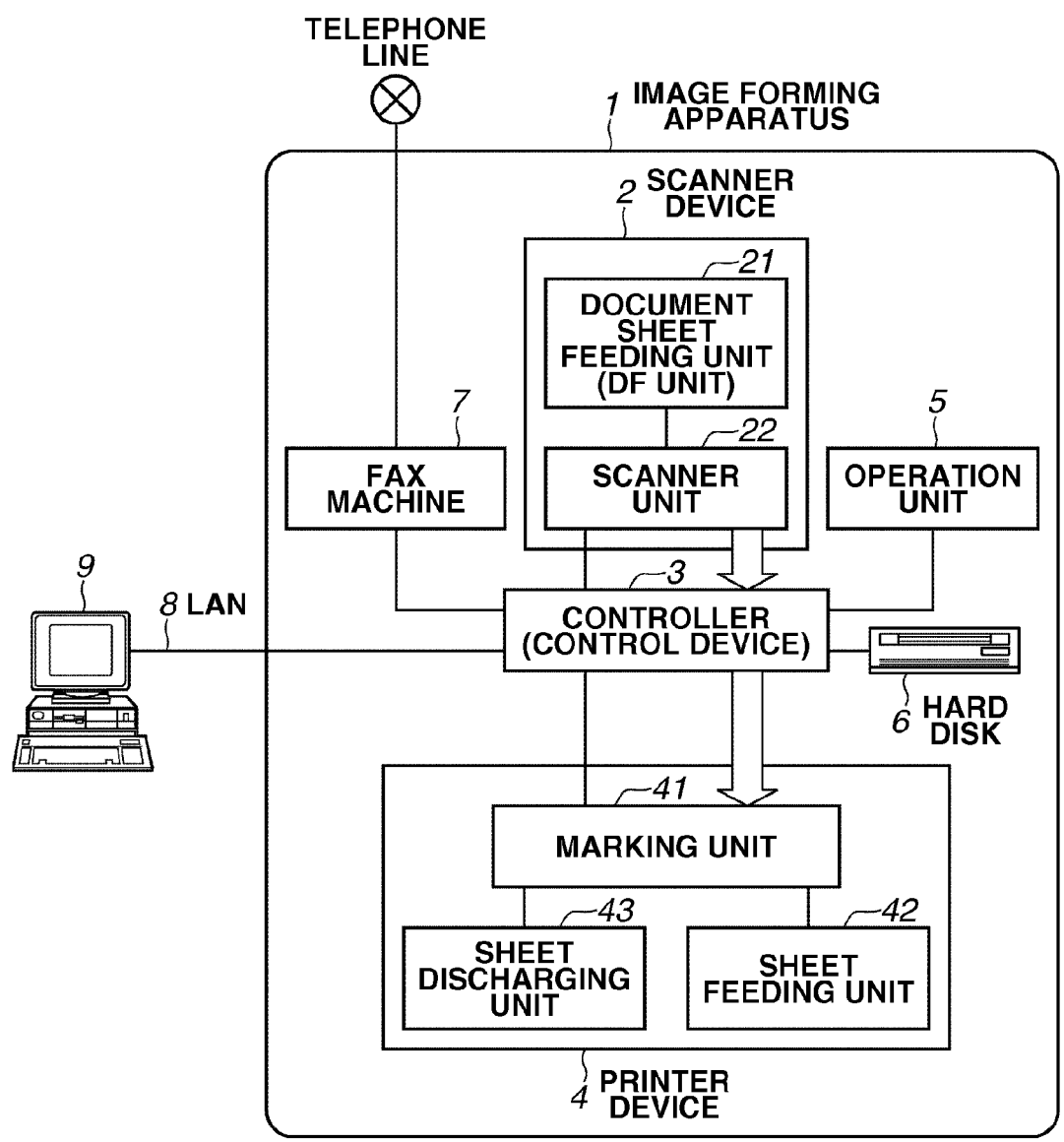
FIG. 1 is a diagram illustrating an example of a system configuration of a system that includes a server and an image forming apparatus and a hardware configuration of the image forming apparatus.

FIG. 1 is a diagram illustrating an example of a system configuration of a system that includes a server and an image forming apparatus and a hardware configuration of the image forming apparatus.

An image forming apparatus 1 includes the following hardware.

A scanner device 2 optically reads an image from a document and converts the image into a digital image. A printer device 4 outputs the digital image to a paper device. An operation unit 5 is used by a user and the like for performing an operation of the apparatus. A hard disk (HDD) 6 stores the digital image, a control program and the like. A FAX machine 7 transmits the digital image to a telephone line and the like. A controller 3 is connected to the above hardware modules, and provides an instruction to each of the hardware modules to execute a job in the image forming apparatus.

The image forming apparatus 1 can perform an input/output of the digital image to/from a server 9 through a local area network (LAN) 8, issuance of a job, an instruction to devices and the like.

The scanner device 2 includes a document sheet feeding unit 21 capable of automatically permuting document stacks in a successive manner and a scanner unit 22 capable of optically scanning a document and converting the document into a digital image. The converted image data is transmitted to the controller 3.

The printer device 4 includes a sheet feeding unit 42 capable of successively feeding a sheet from the paper stack one by one, a marking unit 41 for printing the image data on the fed sheet, and a sheet discharging unit 43 for discharging the sheet after printing.

The image forming apparatus 1 can execute a variety of jobs. An example of functions of the image forming apparatus 1 will be described below.

Copying Function

The image forming apparatus 1 records an image read from the scanner device 2 on the hard disk 6 while performing printing using the printer device 4 at the same time.

Image Transmission Function

The image forming apparatus 1 transmits the image read from the scanner device 2 to the server 9 through the LAN 8.

Image Storing Function

The image forming apparatus 1 records the image read from the scanner device 2 on the hard disk 6, and performs image transmission and image printing as needed.

Image Printing Function

The image forming apparatus 1 analyzes, for example, page description language transmitted from the server 9, and prints the analyzed data by the printer device 4.

In FIG. 1, for simplifying the description, only the image forming apparatus 1 is connected to the server 9 through the LAN 8. However, a plurality of image forming apparatuses may be connected thereto. Further, a normal personal computer (PC) and the like may be connected to the image forming apparatus 1 in addition to the server 9.

Figure 2:
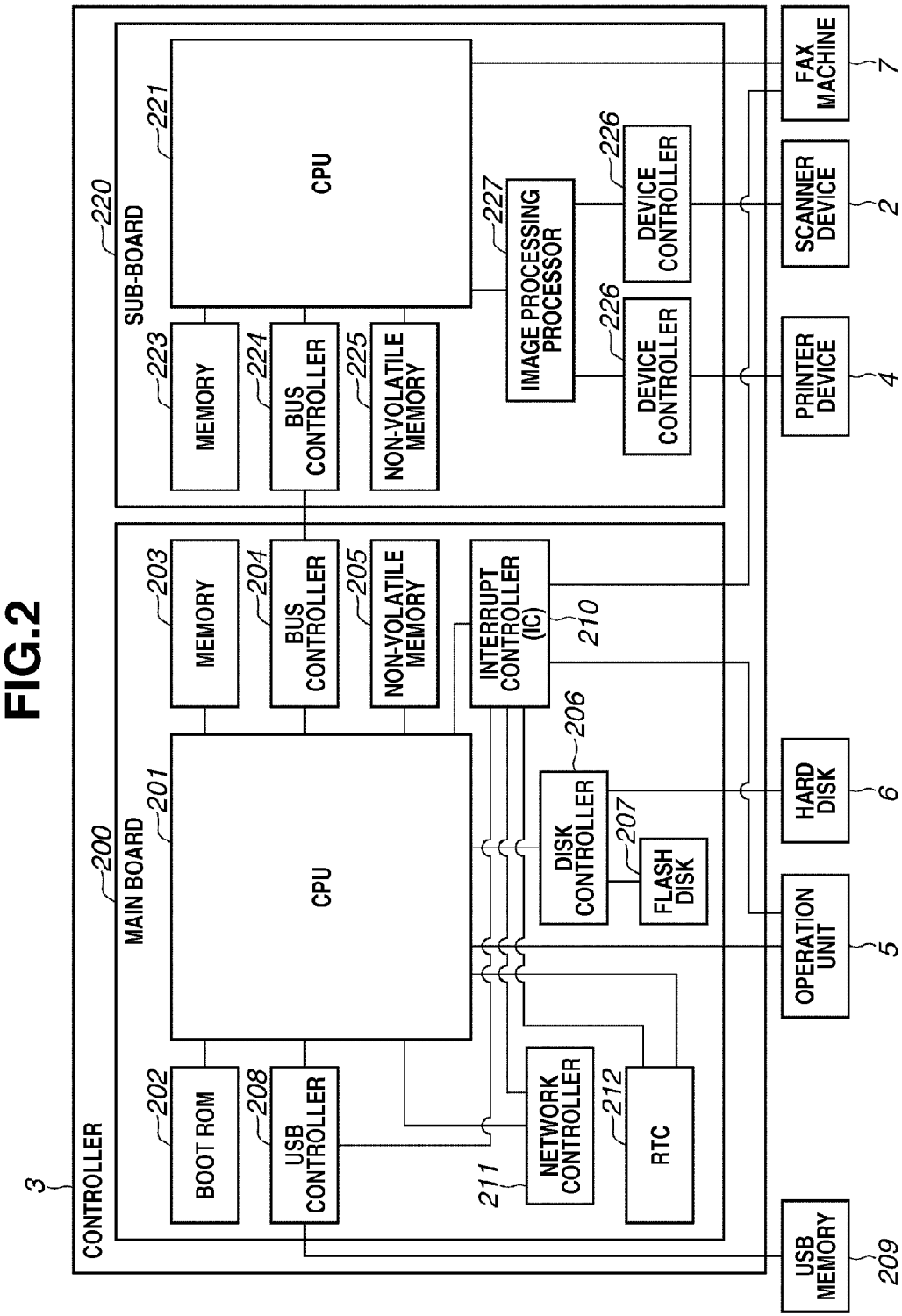
FIG. 2 is a diagram illustrating an example of a hardware configuration of a controller.

FIG. 2 is a diagram illustrating an example of a hardware configuration of the controller 3.

The controller 3 includes a main board 200 and a sub-board 220.

The main board 200 is a "general-purpose" central processing unit (CPU) system.

The main board 200 includes a CPU 201 that controls the entire board, a boot read-only memory (ROM) 202 that includes a boot program, a memory 203 that is used by the CPU as a work memory, and a bus controller 204 that has a bridge function with an external bus. In addition, the main board 200 includes a non-volatile memory 205 that does not lose stored data even when the power source is disconnected, a disk controller 206 that controls a storage device, and a flash disk (solid-state drive (SSD) and the like) 207 that is a relatively small-capacity storage device composed of a semiconductor device. The main board 200 further includes a universal serial bus (USB) controller 208 capable of controlling a USB.

A USB memory 209, the operation unit 5, the hard disk 6 and the like are externally connected to the main board 200.

The CPU 201 is connected to an interrupt controller 210, and is further connected to a network controller (IC) 211, a real-time clock (RTC) 212, and the operation unit 5 having a soft switch.

The CPU 201 executes processing based on a program and the like stored in the memory 203 or the non-volatile memory 205, so that information processing and the like according to the flowcharts described below is realized.

Similarly, the server 9 realizes functions thereof, such as periodical acquisition of data from the image forming apparatus, by the CPU of the server executing processing based on programs stored in a storage device, such as a ROM, a random access memory (RAM), and an HDD of the server.

The sub-board 220 includes a relatively small general-purpose CPU system and image processing hardware. The sub-board 220 includes a CPU 221 that controls the entire sub-board, a memory 223 used by the CPU 221 as a work memory, a bus controller 224 that has a bridge function with an external bus, and a non-volatile memory 225 that does not lose data even when the power source is disconnected.

The sub-board 220 further includes an image processing processor 227 that performs real-time digital image processing and device controllers 226.

The sub-board 220 receives/transmits digital image data from/to the external scanner device 2 and the external printer device 4 through the device controllers 226. The FAX machine 7 is directly controlled by the CPU 221.

FIG. 2 illustrates a simplified configuration of the hardware. For example, the CPU 201, the CPU 221 and the like include a number of pieces of CPU-peripheral hardware such as a chip set, a bus bridge, and a clock generator. However, the description thereof is omitted because such hardware is not directly related to the description of the present exemplary embodiment.

An operation of the controller 3 will be described by taking image copying by a paper device as an example.

When the user instructs image copying from the operation unit 5, the CPU 201 transmits an image reading instruction to the scanner device 2 through the CPU 221. The scanner device 2 optically scans a paper document, converts the scanned data into digital image data, and inputs the digital image data into the image processing processor 227 through the device controller 226. The image processing processor 227 performs a direct memory access (DMA) transfer to the memory 223 through the CPU 221, and temporarily stores the digital image data.

Upon confirming that a fixed amount or all of the digital image data has been input to the memory 223, the CPU 201 outputs an image output instruction to the printer device 4 through the CPU 221. The CPU 221 notifies the image processing processor 227 of a position of the image data in the memory 223. The image data in the memory 223 is transmitted to the printer device 4 through the image processing processor 227 and the device controller 226 according to a synchronization signal from the printer device 4. Then, the digital image data is printed on a paper device by the printer device 4.

When a plurality of copies is to be printed, the CPU 201 stores, in the hard disk 6, image data in the memory 223. For the second and subsequent copies, the CPU 201 can transmit the image to the printer device 4 without obtaining the image from the scanner device 2.

Figure 3:
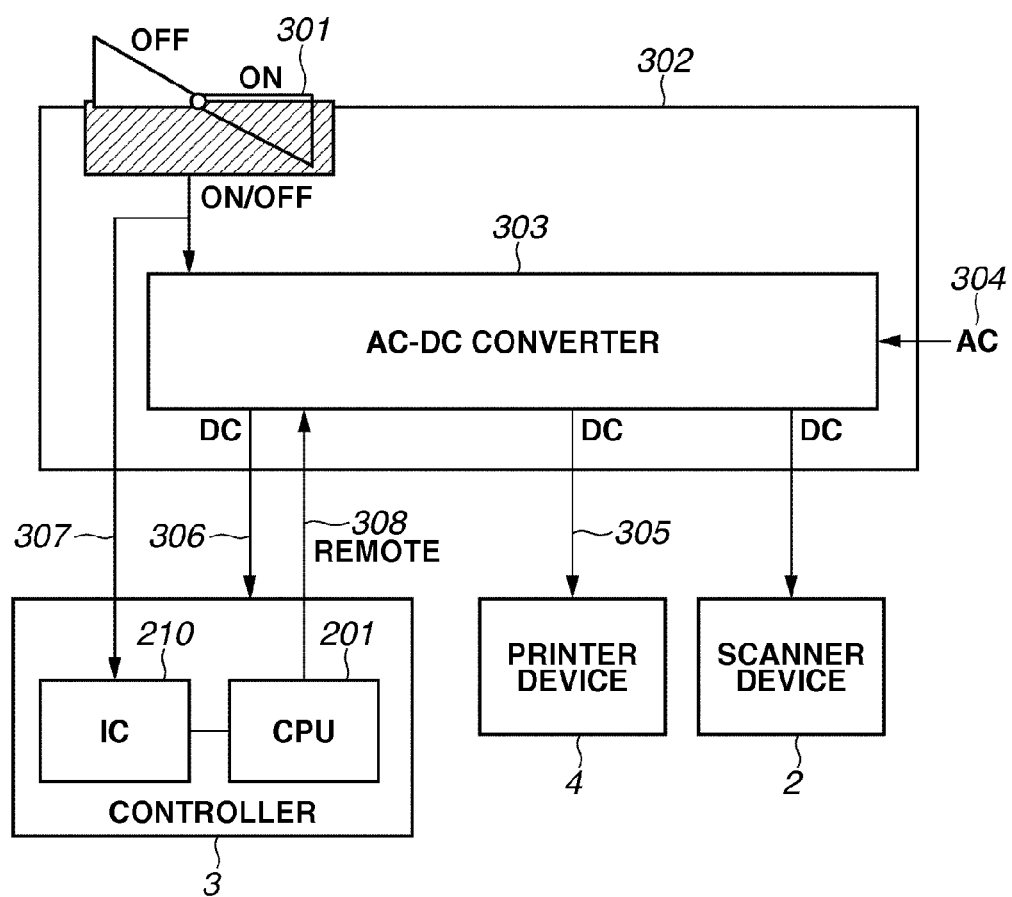
FIG. 3 is a diagram illustrating an example of a power source configuration.

FIG. 3 is a diagram illustrating an example of a power source configuration.

FIG. 3 illustrates a toggle switch 301, a power supply unit 302, an AC-DC converter 303, an AC power input unit 304, a power cable 305 that supplies a DC power source to the printer device 4, a power cable (DC) 306 that supplies a power source to the controller 3, a line 307 that notifies the interrupt controller 210 of the controller 3 of the state of the toggle switch 301, and a power supply remote signal 308 that can be soft-controlled from a general-purpose I/O (GPIO) included in the CPU 201 and that can control an output of the AC-DC converter 303.

An operator can turn on/off the device by operating the toggle switch 301.

This switch 301 is connected to the AC-DC converter 303 when turned on, and can control a power-on state of the power source.

When turned off, the switch 301 must not stop the power supply through the DC 306 until the controller 3 completely shuts down the system. That is, the state of the toggle switch 301 is notified through the line 307, and the DC 306 is turned off after completion of the shutdown using the power supply remote signal of the line 307.

The toggle switch 301 mechanically maintains one of ON/OFF states. The operator turns the switch into either ON or OFF side to input the state.

In the present exemplary embodiment, a toggle switch having explicit OFF/ON is used. However, there are many personal servers and the like that employ a power source switch having no state (including a power source switch that functions as a power-saving transition switch). Such switch having no state indicates the following control patterns:

1. The switch functions as "OFF/saving state transition instruction" in a state where the power source of the device is turned on.

2. The switch functions as "ON" in a state where the power source of the device is turned off.

3. The switch inputs "forcible OFF" by continuing to press the switch for a predetermined time or more.

In the present exemplary embodiment, the description is given using a toggle switch as an example. However, the present exemplary embodiment is not limited to this example, and when the present exemplary embodiment is applied to a switch having no state, ON/OFF of the toggle switch may just be applied to the above-described 1 and 2 ON/OFF patterns.

Figure 4:
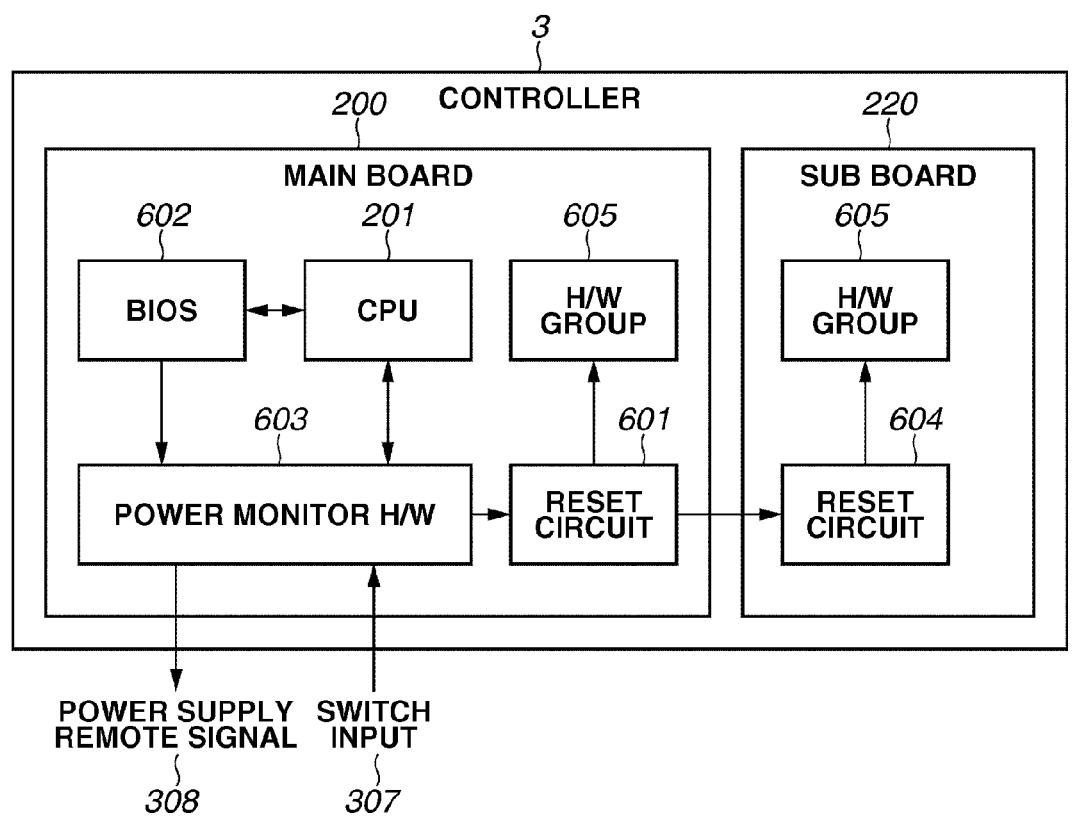
FIG. 4 is a diagram illustrating an example of a hardware configuration of the controller with a focus on a power source control/reset circuit.

FIG. 4 is a diagram illustrating an example of a hardware configuration and the like of the controller 3 focusing on a power source control/reset circuit.

A reset circuit 601 is a circuit on the main board 200. A basic input/output system (BIOS) 602 controls fundamental parts of the hardware (H/W) on the main board 200. A dedicated power monitor H/W 603 monitors the power source control. In a case of an application specific integrated circuit (ASIC) and the like, a small CPU system or the like may be employed. A reset circuit 604 is a circuit on the sub-board 220. An H/W 605 is present on each board. A synchronous H/W resets an internal state by reset. Therefore, in a synchronously assembled H/W circuit, it is necessary for the reset circuit to reset each H/W after the power source is turned on and the power is supplied to each chip.

Since a plurality of H/W chips has a master-slave relationship, reset processing is designed, and reset is sequentially applied. Therefore, typically, as in the present exemplary embodiment, one board has one reset circuit, and each reset circuit performs a reset operation in each board.

The system of the main board 200 serves as a main board especially in the present device, and includes the power monitor H/W 603. The power monitor H/W 603 receives a state of a switch from the line 307. The power monitor H/W 603 can control the power supply in the main board 200 using the power supply remote signal 308.

In a case where the CPU 201 can normally operate, the power monitor H/W 603 can reset the system according to an instruction from the CPU 201. In addition, in a case where the power is not supplied to the CPU 201, the power monitor H/W 603 can control the power supply remote signal 308 with an input from the line 307 to turn on the controller 3.

The BIOS 602 includes a low-level H/W control library and the like. Typically, the BIOS 602 is used to secure compatibility of personal computer/advanced technology (PC/AT) compatible machines, and is not indispensable in a server system. However, the BIOS 602 can execute a part of the power saving function by the advanced configuration and power interface (ACPI) specification, for example.

In the present exemplary embodiment, an ACPI-S3 system (resuming a memory) that is a typical power saving mode will be described as an example. The BIOS is described only for a part of the function. The BIOS is actually a group of programs to be executed by the CPU 201, and is described like a hardware configuration here for simplification of the description.

In an image forming apparatus having the above H/W configuration, for example, when the toggle switch 301 is turned off, the CPU 201 can receive the state of the power source switch through the power monitor H/W 603. That is, normally, the CPU 201 detects the power source OFF and operates the shutdown processing, and instructs shutdown to the power monitor H/W 603. As a result, the power source OFF is notified to the AC-DC converter 303 through the power supply remote signal 308, and the DC 306 that is a power supply source to the controller 3 is turned off, so that the present system is shut down.

Since this shutdown terminates programs on the CPU 201, when the toggle switch 301 is turned on next time, the programs of the CPU 201 are started up as usual.

A typical example of a current technology capable of starting up at high speed includes a speed-up technique by an ACPI-S3 suspend system. A case where the ACPI-S3 system is applied to the present system will be described below.

When the toggle switch 301 is turned off, notification is given to the power monitor H/W 603 through the line 307. The CPU 201 can get to know a phenomenon by an interrupt, and for example, calls a power saving I/F of Kernel. From this, the system finally transitions to the ACPI-S3 state that is a function included in the BIOS 602 and the power monitor H/W 603, and causes the power supply unit 302 to transition to the ACPI-S3 power saving state through the power supply remote signal 308 (a memory and a part of the H/W are in a power-on state).

The system at this time is not in an OFF state but in a "temporary interruption state" in which a program state is held in the memory. In this case, the controller 3 can be started up at high speed in a time equivalent to the wake-up processing of the ACPI-S3. However, when a power saving system by memory resume such as the ACPI-S3 system is selected, reset is applied to H/W devices of the H/W group 605 on the board that is to be reset by the reset circuits 601 and 604 by ON/OFF operations of the power source switch. However, reset control is not applied to the software operating on the CPU 201.

Problems that occur due to not resetting the software for a long time are generally known, and ideally, the control software operating on the CPU 201 can also be reset. However, if the control software on the CPU 201 is reset, it takes a start-up time when start-up is performed next time, and a time at which the system becomes operable for the user is delayed.

Figure 5:
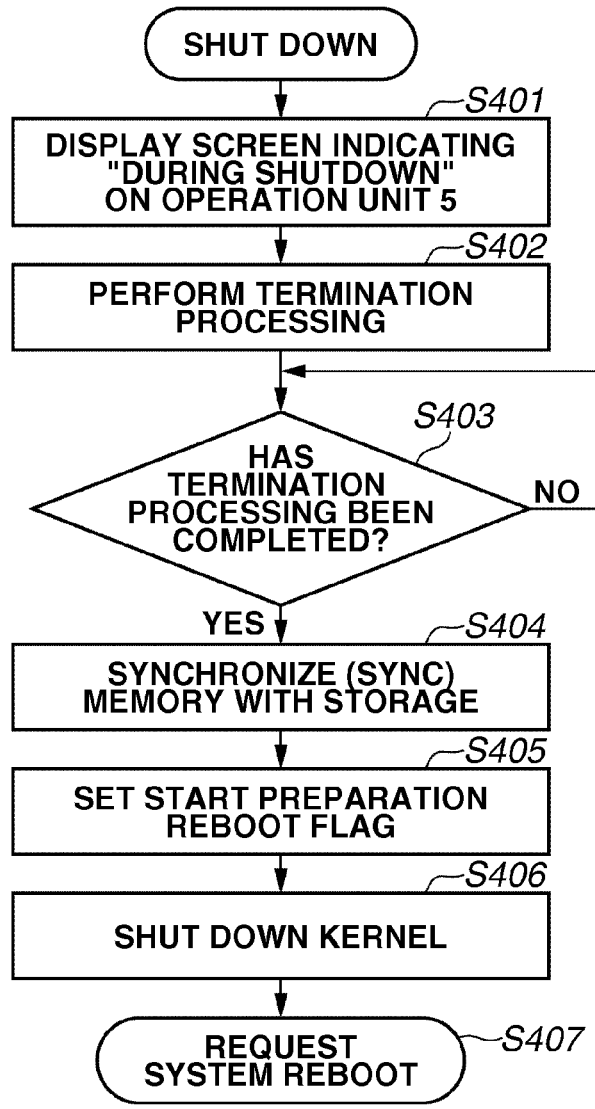
FIG. 5 is a flowchart illustrating an example of shutdown processing.

An example of shutdown processing performed by the CPU 201 in the present exemplary embodiment is described in FIG. 5. The processing of FIG. 5 is an operation performed when the operator terminates the apparatus.

The CPU 201 having detected that the toggle switch 301 has been turned off executes the processing. Also, the CPU 201 that has received notification from the RTC 212 by the auto shutdown timer or by the weekly shutdown through the interrupt controller 210 executes the processing.

In step S401, the CPU 201 displays a screen indicating "during shutdown" on the operation unit 5. However, in a case where the shutdown is not by the toggle switch 301, but is the auto shutdown timer or the weekly shutdown by the RTC 212, the shutdown may sometimes be performed from the sleep state. Therefore, the CPU 201 may not display the screen indicating "during shutdown" on the operation unit 5, or may cause the backlight of the operation unit 5 to be in an OFF state. In step S402, the CPU 201 performs interruption/termination processing of the currently performed service and the like.

Since the termination processing is executed in parallel in a plurality of processes, the CPU 201 waits for completion of the termination in step S403.

In step S404, the CPU 201 synchronizes a value of the memory 203 with a storage of the hard disk 6 or of the flash disk 207. For example, the above step corresponds to processing of synchronizing (SYNC) a storage buffer cached on the memory 203 with the storage by the CPU 201.

In step S405, the CPU 201 performs setting of a start preparation reboot flag. The CPU 201 sets the start preparation reboot flag to any register that is accessible and in which no state is reset by the H/W reset. In the present exemplary embodiment, the power monitor H/W 603 exists above the reset circuit. Therefore, the CPU 201 sets the start preparation reboot flag to a register in the power monitor H/W 603. However, when the system is switched into a power source OFF state instead of the ACPI-S3 power saving state, the CPU 201 may not set the start preparation reboot flag.

In step S406, the CPU 201 calls a shutdown I/F of Kernel, and performs software final termination processing of Kernel.

After that, in step S407, the CPU 201 issues a system reboot request to the power monitor H/W 603. However, when the system is switched into a power source OFF state instead of the ACPI-S3 power saving state, a solenoid is connected to the toggle switch 301 and the toggle switch 301 can be turned off.

The power monitor H/W 603 issues entire system reset to the reset circuit 601. The reset circuit 601 provides notification to the reset circuit 604 on the sub-board 220, so that the reset is issued to the entire board. Since this reset is a reboot request, the reset is also applied to the CPU 201. The CPU 201 performs boot processing from the BIOS 602, for example, by issuance of reset exception.

That is, the present system performs reboot instead of turning the power off in spite of the shutdown. Therefore, the shutdown processing leads to the boot processing of FIG. 6.

Figure 6:
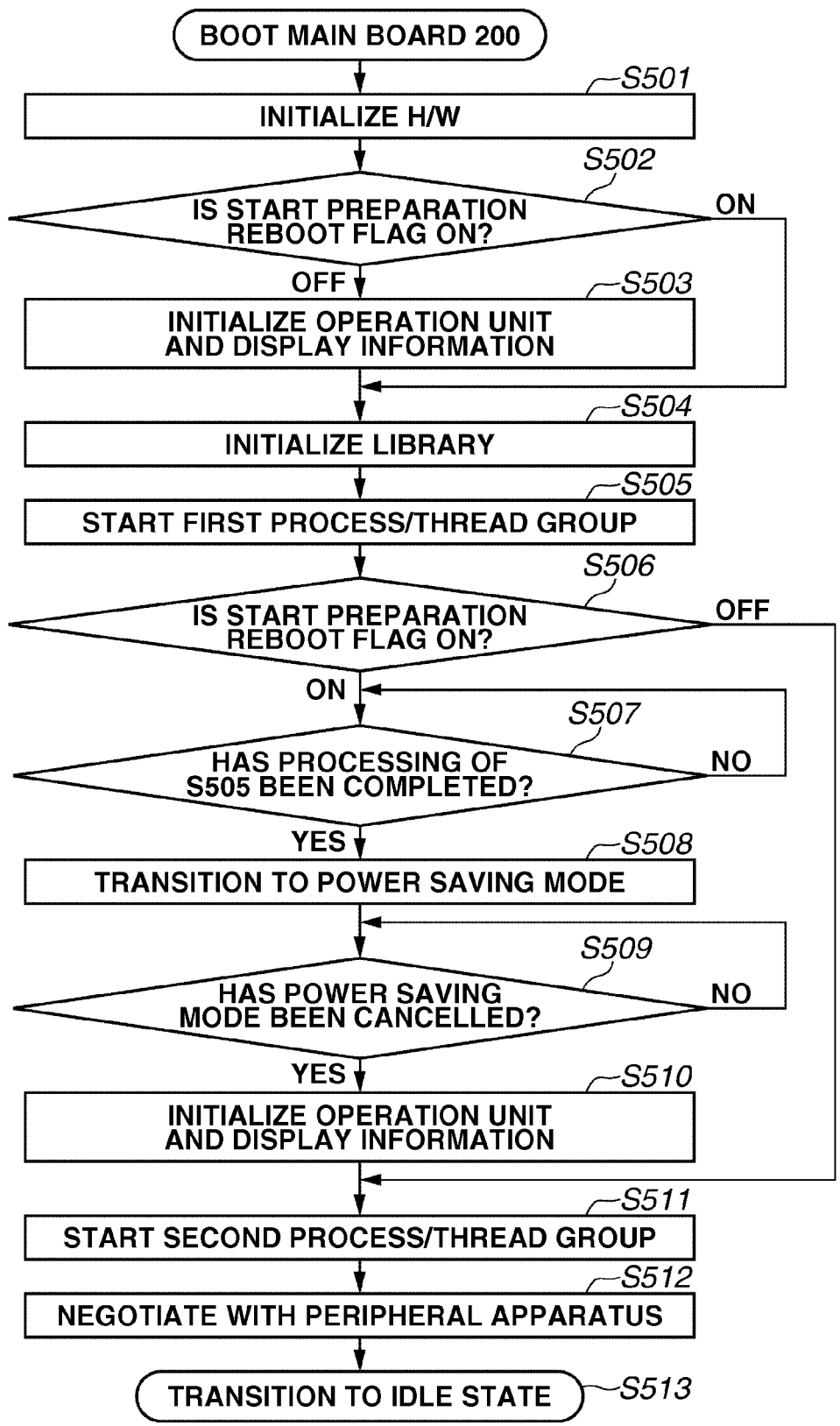
FIG. 6 is a flowchart illustrating an example of boot processing of a main board.

FIG. 6 is a flowchart illustrating an example of the boot processing of the main board 200.

The boot method is started up in multi-stages by the system, and this is a very difficult part. Therefore, the concept of the processing performed by the CPU 201 is made into a flowchart and description will be given.

In step S501, the CPU 201 initializes the H/W. The initialization of the H/W includes initialization of the register and the interrupt, registration of a corresponding device driver in a Kernel start-up unit and the like.

In step S502, the CPU 201 determines whether the current start-up is a boot for preparation for high-speed start-up. To be specific, the CPU 201 determines whether the start preparation reboot flag set in step S405 of FIG. 5 is on, and performs an operation of skipping step S503 when the flag is on.

In step S503, the CPU 201 performs initialization of the operation unit 5 and displays information. Since this is the first display, the CPU 201 performs display indicating "starting up", for example. That is, when the start preparation reboot flag is on, the CPU 201 continues the initialization without displaying information on the operation unit 5.

In step S504, the CPU 201 enters initialization of a software layer.

The CPU 201 calls an initialization routine of each library, and starts up a first process/thread group in step S505. Mainly, for this start-up, a pure software service or the like that has no influence on the peripheral H/W is appropriate. The reason will be described below.

In step S506, the CPU 201 refers to the start preparation reboot flag that the CPU 201 has referred to also in step S502. In a case of the flag being off, it is normal start-up, and therefore, the CPU 201 makes the transition to step S511. In a case of the flag being on, the boot this time is a start-up for start-up preparation, and therefore, in step S507, the CPU 201 waits for completion of the processing at step S505 (or may perform asynchronous control of wait and the like).

In a case where the processing at step S505 is complete under the state where the start preparation reboot flag is on (YES in step S507), the display on the operation unit 5 is not performed and in the middle of start-up. However, in step S508, the processing transitions to a power saving mode. A mode capable of returning at high speed is favorable for the power saving mode. Typically, the ACPI-S4 hibernation and the ACPI-S3 suspend system are major modes, and the system transitions to the ACPI-S3 state having superiority in speed.

A case where the ACPI-S3 suspend system is applied to the present system will be described below. When the toggle switch 301 is turned off, the power source OFF is notified to the power monitor H/W 603 through the path of the line 307. The CPU 201 can get to know the phenomenon by an interrupt, and calls the power saving I/F of Kernel. From this, the system finally transitions to the ACPI-S3 state that is a function included in the BIOS 602 and the power monitor H/W 603, and causes the power supply unit 302 to transition to the ACPI-S3 power saving state through the power supply remote signal 308 (the memory and a part of the H/W are in a power-on state).

Under this state, the start-up is stopped once, and the power-on of the power source is only to the memory 203 on the main board 200 and to the power monitor H/W 603, and the system is put in a start-up standby state with several watts.

In this way, the CPU 201 performs reboot without turning the power off after shutdown is performed, and enters the power saving state in the middle of start-up without displaying information on the operation unit 5 when the start-up is performed next time. It can be seen from the operator that the shutdown seems to continue longer than usual, rather than reboot, and the operator does not feel uncomfortable.

When the operator uses the image forming apparatus 1, the operator turns on the toggle switch 301. Then, the power monitor H/W 603 detects the power source ON from the path of the line 307, and notifies "turn on the entire system by turning on the switch" to the power supply unit 302 through the power supply remote signal 308. The power supply unit 302 supplies the power to the entire system according to the power source ON, to be specific, performs power-on of the controller 3, the printer device 4, and the scanner device 2 through each DC power supply path.

In the printer device 4 and the scanner device 2, respective CPUs start initialization operations by the power source ON.

When being in a suspend state, the controller 3 exits from step S509 of FIG. 6, and in step S510, the CPU 201 initializes the operation unit 5 and displays information. Accordingly, the device is put in a "starting up" state.

Next, in step S511, the CPU 201 initializes a second process/thread group. These programs are mainly used for performing communication for start-up with peripheral devices, such as the printer device 4 and the scanner device 2, and the start-up is not suitable before the ACPI-S3 suspend power saving state at step S505.

In step S512, the CPU 201 negotiates with the printer device 4 and the scanner device 2, and establishes communication. Following that, the CPU 201 transitions to an idle state in step S513.

In this way, the processing of steps S501 to S505 can be omitted at the time of start-up in the normal start-up. Therefore, a device capable of starting up at high speed by the time of the omission can be produced.

Figure 7:
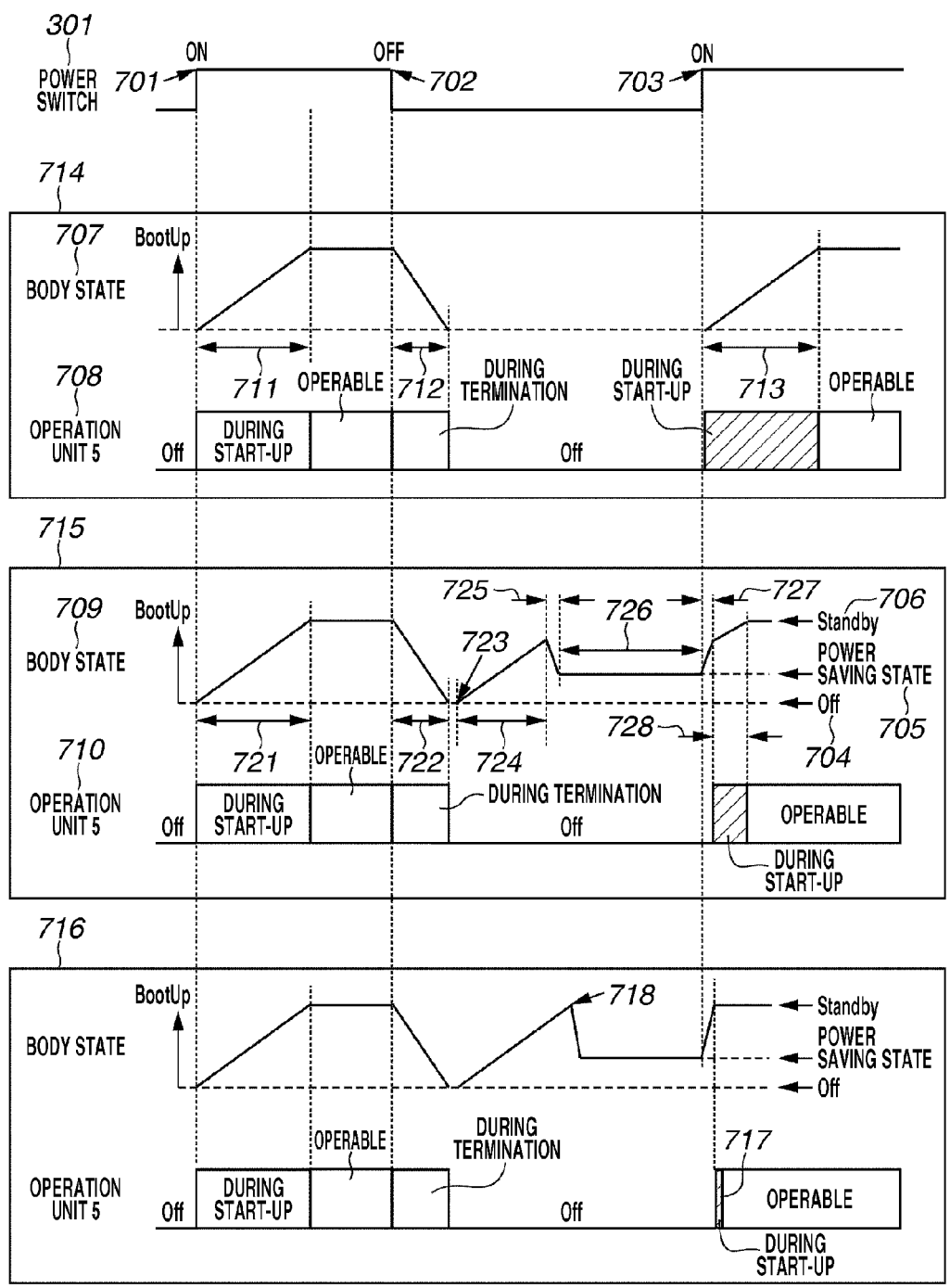
FIG. 7 is a diagram illustrating an example of a temporal change of start processing and a power state.

A state of display on an operation panel and a temporal change of the start processing and the power state of the main body when the above-described processing is applied to a product are illustrated in FIG. 7

In FIG. 7, the horizontal axis represents time. When the toggle switch 301 is turned on at time 701, turned off at time 702, and turned on at time 703, conventional operations are described in lines 707 and 708, and processing to which the present exemplary embodiment is applied is described in lines 709 and 710.

First, the dotted line part in block 714, and the lines of the conventional operation in line 707 will be described. The vertical axis represents a boot state, and a Y axis=0 point represents power source OFF, and a point of BootUp represents boot completion. After the power source ON at time 701, the system is started up by taking a time 711. During this period, "during start-up" is displayed on the operation unit 5 in line 708. When power source OFF at time 702 occurs under an operable state, the shutdown processing is performed for a time 712, and when the shutdown is completed, the power source is put in an OFF state, and the panel display is turned off. When the power source is turned on at time 703, start processing 713 similar to processing for the time 711 is performed again and the system is started up. Therefore, there is little difference in the processing performed at the time of OFF/ON, and the start-up is performed in almost the same time. This figure illustrates from typical start-up to shutdown.

Next, the dotted line part in block 715 and the line 709 in the system of the present exemplary embodiment will be described. The vertical lines indicate the positions 704 to 706, and especially, the point of y=705 represents the power saving state (it does not mean that the system enters power saving during start-up at time 723). Display content 710 on the operation unit 5 corresponds to the state of line 709.

Normal start-up 721 is similar to processing for the time 711. When the toggle switch 301 is turned off at time 702 under a state where normal start-up has been completed, the shutdown processing illustrated in FIG. 5 is executed, and a section 722 is made. A delay occurring due to the system reboot request at step S407 corresponds to time 723, after which the boot processing illustrated in FIG. 6 is executed. Processing 724 corresponds to the processing in steps S501 to S507 of FIG. 6, and in the case of start-up in the present exemplary embodiment, the operation unit initialization/display in step S503 is not performed. Therefore, the start-up can be performed without displaying information on the operation unit 5 during this section. Processing 725 corresponds to step S508, and transitions to the power saving mode (in the present exemplary embodiment, to the ACPI-S3 state). Usually, the transition time is not so long. Processing 726 of waiting for ON of the toggle switch 301 under a state where the state transition has been completed corresponds to the processing in step S509. When the toggle switch 301 is turned on at time 703, power saving wake-up is performed for a time 727, and the initialization of the operation unit and display of information is executed in step S510. Accordingly, display of "during start-up" is performed in line 710. Following that, during a period 728, "during start-up" continues for the time of completion of the processing in steps S511 and S512, and then, the system is put in the operable state in step S513.

In this way, when the operator turns off the power source at time 702, the preparation processing of start-up for the next time like the present exemplary embodiment is performed in advance, whereby the time during start-up can be shortened. Further, by not performing operation display after reboot, it becomes equivalent to continuing the shutdown state when seen from outside. Therefore, high-speed start-up can be realized without especially causing uncomfortable feeling.

The operation unit OFF state in line 710 may be an OFF state of the power source, or when the power source is in an ON state, similar effects can be obtained by making up an equivalent of the OFF state such as turning off the backlight and displaying black.

In addition, in the case of not caring about how it looks or a device having no operation unit, there is a method for not performing a special operation for the operation unit 5 in line 710. Although not illustrated, this method can shorten the start-up time.

After turning off the toggle switch 301, when shutdown is performed, "during termination" is displayed on the operation unit 5, and then "during start-up" is displayed when reboot is performed, similarly to normal start-up. Following that, operation display disappears, and ON of the power source switch 703 is waited for. Therefore, it is less uncomfortable if the processing is applied to a product in which the start-up time is originally not so long.

In addition, a case can be considered where the processing in steps S511 and S512 is not necessary during the boot processing illustrated in FIG. 6. In this case, the timing of the end of step S507 corresponds to completion of start-up, and an equivalent of step S513 corresponds to the point of time 718. Since the processing enters the power saving mode after the completion of start-up instead of in the middle of start-up, a block 716 is obtained. In this case, the wake-up time from the power saving state 717 becomes equal to the operable state.

In applying the system in block 716 of the present exemplary embodiment, in the case of a device having power saving start-up, a time from the operable state at time 718 to entering the power saving is defined. When a device has a power saving function by a normal timer, the device automatically transitions to the power saving mode after a predetermined time from restart. Therefore, the device transitions to the power saving state by being left after the restart without applying the present exemplary embodiment. However, the present exemplary embodiment has a characteristic of automatically transitioning into the power saving state in a shorter time than the time to transition to the power saving, ideally, at an earliest possible time after entering the operable state, whereby the power consumption of the device can be minimized.

The sleep state means a power saving state in which a power consumed amount can be suppressed, and the start-up time can be made earlier than the time of normal start-up. When a predetermined time has elapsed without the user performing an operation, or when a soft switch on the operation unit 5 is pressed, the system transitions to the sleep state.

A power supply state of hardware will be described. The power source supplied from the AC 304 is converted in the AC-DC converter 303, and is supplied from the DC 306 to the controller 3. When in the sleep state, the power is supplied to minimum required portions such as the memory 203, the interrupt controller 210, the network controller 211, the RTC 212, and the USB controller 208 on the controller 3, the soft switch on the operation unit 5, and a part of the FAX machine 7. That is, in the present exemplary embodiment, in the sleep state, the power supply to at least the scanner device 2, the printer device 4, the operation unit 5, the HDD 6, and the H/W on the sub-board 220 is stopped. Next, an operation when the image forming apparatus returns from sleep (power saving state) will be described. When the interrupt controller 210 receives at least one interrupt during sleep, such as the network, the RTC (timer or alarm), the FAX (incoming call or off hook), the soft switch, and the USB (insertion and extraction or communication), the interrupt controller 210 notifies the CPU 201. Upon receiving the notification, the CPU 201 performs processing of returning the states of the power supply and the software to the start-up state.

The normal state includes not only a state where the power is supplied to all units, but also a state where the power is not supplied to the printer device 4 while no printing is performed. In addition, when it is known that the operation unit 5 is not lightened up and the user is not present in front of an image forming apparatus, there is a state where, for example, the power is not supplied to the scanner device 2. However, since the description will digress from the main topic, details thereof are omitted.

The first exemplary embodiment describes processing of setting the shutdown prohibition timer to 10 minutes using returning from sleep as a trigger when the user has enabled the auto shutdown timer or the weekly shutdown, and when the image forming apparatus returns from the sleep state.

Figure 8:
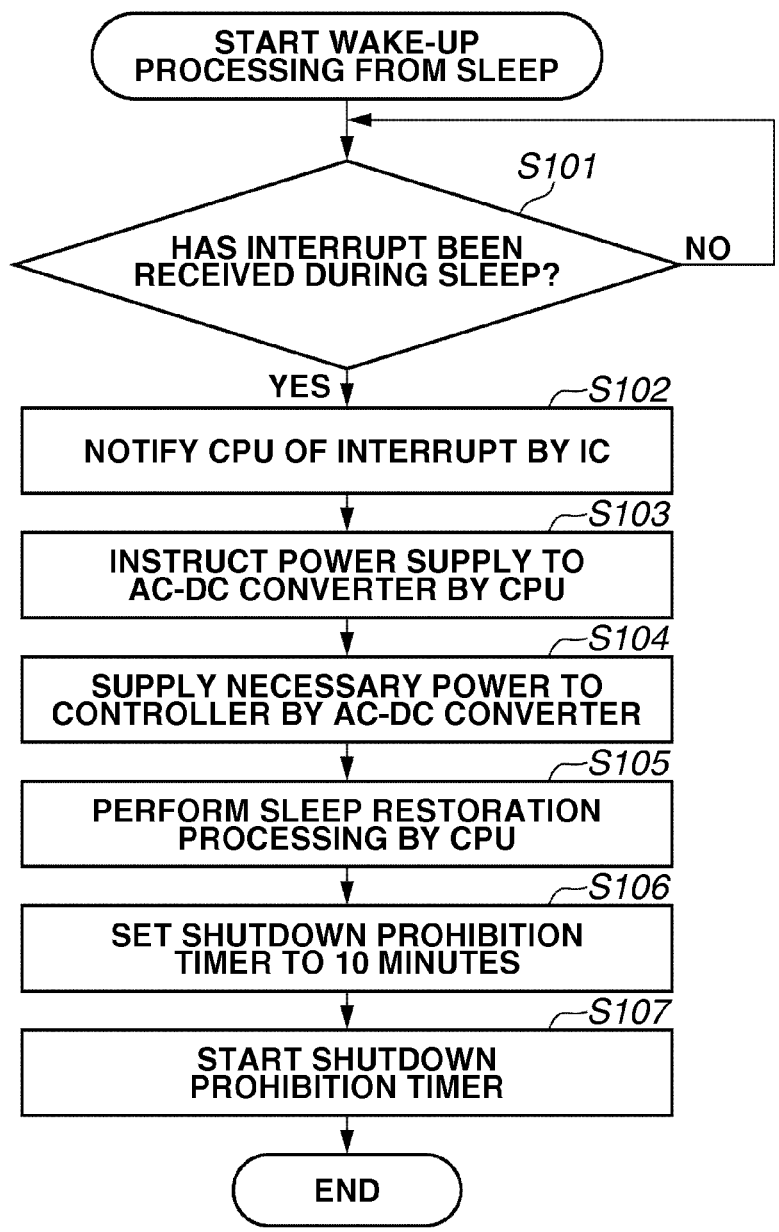
FIG. 8 is a flowchart illustrating an example of sleep wake-up processing.

The processing of the first exemplary embodiment will be described with reference to FIG. 8.

Sleep wake-up processing of the image forming apparatus 1 will be described. When a data acquisition request by the SNMP is given from the server 9 during sleep, for example, the image forming apparatus 1 receives, through the network controller 211, an interrupt to the interrupt controller (IC) 210 (YES in step S101). The interrupt controller 210 provides notification to the CPU 201 in step S102. The CPU 201 instructs power supply to the AC-DC converter 303 in step S103. The AC-DC converter 303 supplies power necessary for operation to the controller 3 through the DC 306 in step S104. The CPU 201 performs sleep wake-up processing such as register setting of hardware, sleep wake-up notification of software and the like, as needed in step S105. Following that, the CPU 201 sets the shutdown prohibition timer to 10 minutes in step S106, and starts the shutdown prohibition timer in step S107. That is, in the present exemplary embodiment, the image forming apparatus 1 sets the shutdown prohibition timer and starts measurement of a time upon returning from sleep. Note that the time measurement by the shutdown prohibition timer is not reset once the time measurement is started, even if a data acquisition request by the SNMP by the server 9 or other PCs is given subsequently.

Figure 9:
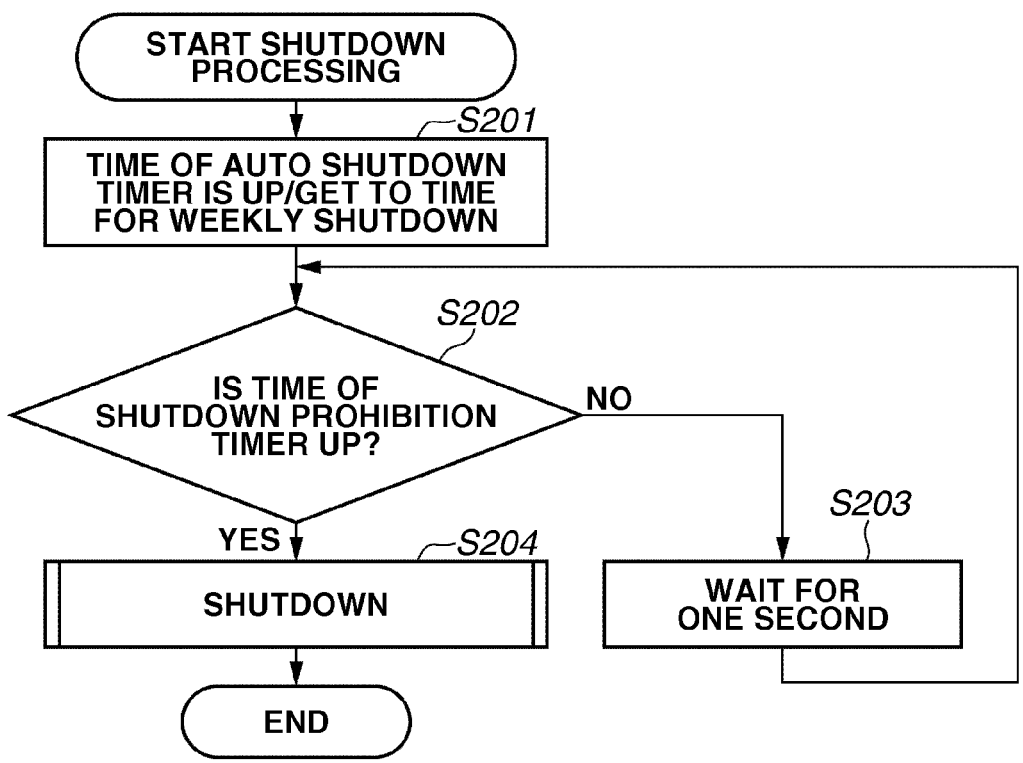
FIG. 9 is a flowchart illustrating an example of the shutdown processing.

The shutdown processing of the image forming apparatus 1 will be described. FIG. 9 is a flowchart illustrating an example of the shutdown processing. The image forming apparatus 1 receives time notification when the time of the auto shutdown timer is up, or the time reaches the weekly shutdown time set in advance in step S201. Note that the time of the weekly shutdown is set independently of the above-described shutdown prohibition timer. The image forming apparatus 1 confirms whether the time of the shutdown prohibition timer is up in step S202, and waits for one second in step S203 if the time has not been up (NO in step S202). When the time of the timer has been up (YES in step S202), the image forming apparatus 1 executes the shutdown in step S204. The shutdown has been described with reference to the flowchart of FIG. 5.

Here, the image forming apparatus 1 sets the shutdown prohibition timer when returning from sleep by the network controller 211. However, the cause of the sleep wake-up may be an off the hook or an incoming call of the FAX machine 7, a timer or an alarm of the RTC 212, a soft switch of the operation unit 5, insertion and extraction of the USB controller 208, an operation of the toggle switch 301 and the like other than the network. Further, the cause may be the notification to the interrupt controller 210 and the like. Since the description will digress from the main topic, details thereof are omitted.

Further, it is assumed that the shutdown prohibition timer prohibits not the shutdown of the user operation by an off of the toggle switch 301 and the like in a set section, but automatic shutdown such as by an auto shutdown timer and weekly shutdown. Since the description will digress from the main topic, details thereof are omitted.

In addition, in the first exemplary embodiment, when the sleep wake-up processing and the shutdown processing occur at the same timing, the shutdown processing may be performed before setting the shutdown prohibition timer in the sleep wake-up processing. When the shutdown processing is performed earlier, whether the setting of the shutdown prohibition timer in the sleep wake-up processing is preferentially performed or the shutdown processing is preferentially performed by serial processing depends on the priority of the system. Either pattern can be executed. Since the description will digress from the main topic, details thereof are omitted.

According to the first exemplary embodiment, the shutdown is extended during execution of the shutdown prohibition timer. When data is drawn from the server at almost the same time as the time set by the auto shutdown timer or by the weekly shutdown, the shutdown is not desirably performed immediately after wake-up from the sleep. However, according to the processing of the first exemplary embodiment, the shutdown can be extended and the server can reliably draw the data in such a case.

In the case of the first exemplary embodiment, the image forming apparatus 1 can set the timer using the wake-up from the sleep state as a trigger when originally in the sleep state. However, when originally in the start-up status, the image forming apparatus 1 cannot set the timer because there is no trigger.

Therefore, an image forming apparatus 1 according to a second exemplary embodiment sets an RTC (alarm) at the weekly shutdown time or one minute before the time-up of the auto shutdown timer, and performs network measurement until the shutdown time. Note that, regarding the time of one minute earlier, the one minute is set because most of the operation setting of the designated time is by minutes. However, any predetermined time may be set.

A CPU 201 performs the network measurement of data communicated through a network controller 211. The CPU 201 measures at least one of a transmission/reception data amount between the CPU 201 and a host connected by transmission control protocol/internet protocol (TCP/IP) or by user datagram protocol/internet protocol (UDP/IP) in packets of a unicast, a band usage rate (the entire measured section or at the end of the measurement), and the number of steps of a router on a path to a target host (time to live (TTL)).

When the transmission/reception data amount obtained by the network measurement exceeds a threshold (e.g., 1 MB/sec), the CPU 201 determines that a large amount of data is being transmitted. However, when the band usage rate is smaller than a predetermined value, the CPU 201 determines that other transmission/reception is competing, and reduces the threshold of the measurement data amount according to the rate. In addition, when the value of the TTL is larger than a predetermined value, the CPU 201 determines that the transmission is being performed to a distant destination, and reduces the threshold of the transmission/reception data amount according to the number of steps.

The interrupt controller 210, which has received the interrupt of the RTC 212, executes shutdown using the CPU 201.

When the user has enabled the auto shutdown timer or the weekly shutdown, and the CPU 201 determines that transmission/reception of a large amount of data is being performed immediately before the execution of shutdown, the CPU 201 sets the shutdown prohibition timer to 10 minutes.

Processing in the second exemplary embodiment will be described with reference to FIG. 10. FIG. 10 is a flowchart illustrating an example of shutdown prohibition timer extension processing.

The shutdown prohibition timer extension processing in the image forming apparatus 1 will be described. A shutdown time is set when the function of the auto shutdown timer or of the weekly shutdown is enabled, and is set when the function is enabled at the time of start-up or the function is enabled by the operation unit 5 and the like. An initial value of the shutdown prohibition timer is 0 minute.

In step S301, the CPU 201 confirms an expected time to shut down that is a total value of a shutdown time and a shutdown prohibition timer.

In step S302, the CPU 201 sets a network measurement start time that is obtained by subtracting a predetermined time (10 minutes) from the total value of the shutdown time and the shutdown prohibition timer (0 minute).

Next, the CPU 201 confirms in step S303 whether the time has reached the network measurement start time, and starts network measurement in step S304 in the case where the time has reached the network measurement start time (YES in step S303). That is, the CPU 201 starts the network measurement for measuring a communication data amount when the time reaches a predetermined time before the expected time to shut down.

Next, the CPU 201 confirms in step S305 whether the time has reached the shutdown time, and terminates the network measurement in step S306 and calculates the communication data amount in step S307 in the case where the time has reached the shutdown time (YES in step S305). When the communication data amount has exceeded the threshold (YES in step S308), the CPU 201 sets the shutdown prohibition timer to 10 minutes and starts in step S309. When the communication data amount has not exceeded the threshold (NO in step S308), the CPU 201 performs the shutdown in step S310.

When the CPU 201 determines in step S303 whether the time has reached the network measurement start time, the CPU 201 can use the RTC (timer) as a trigger. Therefore, a state of the image forming apparatus 1 immediately before step S303 may be the sleep state. In the second exemplary embodiment, the power control processing of making transition to the sleep state is not indispensable, and therefore, details are omitted.

An example of shutdown prohibition timer setting of the second exemplary embodiment will be described with reference to FIG. 11.

A transmission/reception data amount (H103) will be described.

When the data amount of the network communication is 60 MB/minute, the amount is equivalent to the threshold 60 MB/minute, and therefore, the CPU 201 determines that the communication will end at a usual time, and sets the shutdown prohibition timer to 10 minutes (default value).

When the data amount of the network communication is 90 MB/minute, the amount is 1.5 times the threshold 60 MB/minute, and therefore, the CPU 201 determines that the communication will end early, and sets the shutdown prohibition timer to 5 minutes.

When the data amount of the network communication is 40 MB/minute, the amount is smaller than the threshold 60 MB/minute. Therefore, the CPU 201 determines that it is not data drawn by the server but an inquiry and shutdown is possible, and does not set the shutdown prohibition timer.

A TTL (H104) will be described.

When the TTL is less than 10 steps, the CPU 201 determines that the image forming apparatus and the server are closely located, and sets the shutdown prohibition timer to 10 minutes (default value).

When the TTL is 10 steps or more, the CPU 201 determines that the image forming apparatus and the server are distantly located, and sets the shutdown prohibition timer to 11 minutes.

A band usage rate (H105) will be described.

When the band usage rate is 50% or more, the CPU 201 determines that only one communication is performed, and sets the auto shutdown timer to 10 minutes (default value).

When the band usage rate is less than 50%, the CPU 201 determines that data transmission/reception between other servers is simultaneously performed, and sets the auto shutdown timer to 11 minutes.

A protocol (H101) and a port number (H102) will be described.

In the case of an inquiry by the SNMP protocol, shutdown cannot be performed if the inquiry interval is short, and therefore, the CPU 201 does not set the shutdown prohibition timer.

The SNMP protocol is an example of the predetermined protocol.

The above description is an example, and the CPU 201 can increase/decrease the above value according to the CPU of the image forming apparatus or the specification of communication.

According to the processing of the second exemplary embodiment, the shutdown prohibition timer can be set not only originally in the sleep state but also in the start-up state in addition to the extension of the shutdown during execution of the shutdown prohibition timer.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card and the like.

As described above, according to the above-described exemplary embodiments, the server can reliably acquire data from the image forming apparatus.

While exemplary embodiments of the present invention have been described in detail, the present invention is not limited to a specific exemplary embodiment, and various modifications and alternations are possible within the gist of the present invention described in claims.

According to the exemplary embodiments of the present invention, a server can reliably acquire data from an image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-200765 filed Sep. 12, 2012, which is hereby incorporated by reference herein in its entirety.

What is claimed is:

1. An image forming apparatus comprising:
   a setting unit configured to set a prohibition timer that prohibits shutdown when the image forming apparatus returns from a power saving state; and
   a control unit configured, when a shutdown time set in advance has passed, to control the shutdown of the image forming apparatus to be delayed until a time of the prohibition timer set by the setting unit is up, and to control, in a case where the shutdown of the image forming apparatus is delayed, the shutdown of the image forming apparatus to be performed in response to the time of the prohibition timer being up.

2. The image forming apparatus according to claim 1, wherein the prohibition timer and the shutdown time are set independently of each other.

3. The image forming apparatus according to claim 1, wherein time measurement by the prohibition timer is started in response to returning from the power saving state.

4. The image forming apparatus according to claim 1, wherein the control unit causes the image forming apparatus to return from the power saving state in response to a data acquisition request from a server.

5. The image forming apparatus according to claim 1, wherein the control unit causes the image forming apparatus to return from the power saving state in response to a user operation performed via an operation unit.

6. The image forming apparatus according to claim 1, wherein the control unit causes the image forming apparatus to return from the power saving state in response to facsimile reception.

7. A method for controlling an image forming apparatus, the method comprising:
   setting a prohibition timer that prohibits shutdown when the image forming apparatus returns from a power saving state; and
   controlling, when a shutdown time set in advance has passed, the shutdown of the image forming apparatus to be delayed until a time of the set prohibition timer is up, and controlling, in a case where the shutdown of the image forming apparatus is delayed, the shutdown of the image forming apparatus to be forcibly performed in response to the time of the prohibition timer being up.

8. A non-transitory storage medium having stored a program for causing a computer to execute a method comprising:
   setting a prohibition timer that prohibits shutdown when the image forming apparatus returns from a power saving state; and
   when a shutdown time set in advance has passed, controlling the shutdown of the image forming apparatus to be delayed until a time of the set prohibition timer is up, and controlling, in a case where the shutdown of the image forming apparatus is delayed, the shutdown of the image forming apparatus to be performed in response to the time of the prohibition timer being up.

* * * * *

UNITED STATES PATENT AND TRADEMARK OFFICE
CERTIFICATE OF CORRECTION

| | | |
|---|---|---|
| PATENT NO. | : 9,143,646 B2 | Page 1 of 1 |
| APPLICATION NO. | : 14/023237 | |
| DATED | : September 22, 2015 | |
| INVENTOR(S) | : Atsushi Hikichi | |

It is certified that error appears in the above-identified patent and that said Letters Patent is hereby corrected as shown below:

Title page item "(30) Foreign Application Priority Data" should be added/updated as follows:

Sep. 12, 2012   (JP) ....................... 2012-200765

Signed and Sealed this
Twenty-second Day of March, 2016

Michelle K. Lee
*Director of the United States Patent and Trademark Office*